United States Patent
Sane et al.

(10) Patent No.: US 10,254,768 B2
(45) Date of Patent: Apr. 9, 2019

(54) SPACE PARTITIONING FOR MOTION PLANNING

(71) Applicant: Sikorsky Aircraft Corporation, Stratford, CT (US)

(72) Inventors: Harshad S. Sane, Southbury, CT (US); Jason C. Derenick, Hamden, CT (US); Brendan J. Englot, New York, NY (US); Thomas A. Frewen, West Hartford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/521,544

(22) PCT Filed: Oct. 28, 2015

(86) PCT No.: PCT/US2015/057696
§ 371 (c)(1),
(2) Date: Apr. 24, 2017

(87) PCT Pub. No.: WO2016/069678
PCT Pub. Date: May 6, 2016

(65) Prior Publication Data
US 2017/0308102 A1    Oct. 26, 2017

Related U.S. Application Data

(60) Provisional application No. 62/069,504, filed on Oct. 28, 2014.

(51) Int. Cl.
G05D 1/10 (2006.01)
G01C 21/32 (2006.01)
G01C 21/34 (2006.01)

(52) U.S. Cl.
CPC .............. *G05D 1/10* (2013.01); *G01C 21/32* (2013.01); *G01C 21/34* (2013.01)

(58) Field of Classification Search
CPC ................................. G05D 1/10; G01C 21/34
See application file for complete search history.

(56) References Cited

U.S. PATENT DOCUMENTS

2011/0106307 A1  5/2011  Kim et al.
2012/0078585 A1  3/2012  Ilies et al.
2013/0268232 A1  10/2013  Poduri et al.

OTHER PUBLICATIONS

International Search Report and Written Opinion of the International Search Authority dated Jan. 21, 2016 in related PCT Application No. PCT/US2015/057696, 7 pages.
(Continued)

*Primary Examiner* — Michael D Lang
(74) *Attorney, Agent, or Firm* — Cantor Colburn LLP

(57) ABSTRACT

An aspect includes space partitioning for vehicle motion planning. A plurality of obstacle data is analyzed to determine a plurality of obstacle locations in a configuration space of a vehicle. A partitioning of the configuration space is performed to compute a skeletal partition representing a plurality of obstacle boundaries based on the obstacle locations. The skeletal partition is used to preferentially place a plurality of samples by a sampling-based motion planner. At least one obstacle-free path is output by the sampling-based motion planner based on the samples.

12 Claims, 5 Drawing Sheets

(56) References Cited

OTHER PUBLICATIONS

Burns, et al.; "Sampling-Based Motion Planning with Sensing Uncertainty"; 2007 IEEE International Conference on Robotics and Automation, Rome, Italy, Apr. 10-14, 2007; 6 pages.
Elbanhawi, et al.; "Sampling-Based Robot Motion Planning: A Review"; IEEE Access, Feb. 4, 2014; 22 pages.
EP Search Report, PCT/US2015/057696; dated Jun. 6. 2018; 11 pages.
Holleman, et al.; "A Framework for Using the Workspace Medial Axis in PRM Planners"'; 2000 IEEE International Conference on Robotics & Automation, San Francisco, CA, Apr. 2000; 6 pages.
Hsu, et al.; "Adaptively Combining Multiple Sampling Strategies for Probabilistic Roadmap Planning"; 2004 IEEE Conference of Robotics, Automation and Mechatronics, Singapore, Dec. 1-3, 2001; 6 pages.

SPACE PARTITIONING FOR MOTION PLANNING

CROSS-REFERENCE TO RELATED APPLICATIONS

The present application is a 371 National Stage of International Patent Application No. PCT/US2015/057696, filed on Oct. 28, 2015, which claims priority to U.S. Provisional Application No. 62/069,504, filed on Oct. 28, 2014, the contents of which are incorporated herein by reference in their entirety.

BACKGROUND OF THE INVENTION

The subject matter disclosed herein generally relates to motion planning systems, and more particularly to space partitioning for motion planning.

Motion planning for a robot or vehicle typically uses a sample-based planning algorithm to construct a graph or tree that represents feasible paths to various locations in an area under consideration. Algorithms that can be used to construct the graph typically rely on random-number generators and placing random samples around a vehicle configuration space as constrained by obstacles and having a free edge to another node in the graph. The vehicle configuration space defines an area under consideration for identifying one or more feasible paths to safely guide the vehicle around any obstacles. The random samples are either connected to the graph or rejected based on feasibility of connection with the graph. In a completely random sampling strategy, a high number of samples can be rejected especially if the vehicle configuration space is highly constrained, such as in a dense, obstacle-rich environment. The vehicle configuration space is typically difficult to determine a priori in a closed-form with a high degree of granularity and accuracy.

BRIEF DESCRIPTION OF THE INVENTION

According to an aspect of the invention, a method of space partitioning for motion planning includes analyzing a plurality of obstacle data to determine a plurality of obstacle locations in a configuration space of a vehicle. A partitioning of the configuration space is performed to compute a skeletal partition representing a plurality of obstacle boundaries based on the obstacle locations. The skeletal partition is used to preferentially place a plurality of samples by a sampling-based motion planner. At least one obstacle-free path is output by the sampling-based motion planner based on the samples.

In addition to one or more of the features described above or below, or as an alternative, further embodiments could include where the partitioning of the configuration space is performed by computing a medial axis between the obstacle locations as the skeletal partition.

In addition to one or more of the features described above or below, or as an alternative, further embodiments could include where the partitioning of the configuration space is performed by computing Voronoi tessellation edges of the obstacle locations as the skeletal partition.

In addition to one or more of the features described above or below, or as an alternative, further embodiments could include where the configuration space is partitioned into three-dimensional cells defined as free space or obstacles.

In addition to one or more of the features described above or below, or as an alternative, further embodiments could include applying a weighted distribution to assign a placing higher percentage of the random samples closer to the skeletal partition.

In addition to one or more of the features described above or below, or as an alternative, further embodiments could include applying a cost function to determine a lowest cost path of the at least one obstacle-free path.

In addition to one or more of the features described above or below, or as an alternative, further embodiments could include placing un-weighted random samples in the configuration space to search for a lower cost path based on identifying the at least one obstacle-free path.

In addition to one or more of the features described above or below, or as an alternative, further embodiments could include where the method is performed by a system of the vehicle.

In addition to one or more of the features described above or below, or as an alternative, further embodiments could include where the obstacle data are acquired from a combination of a priori terrain data and sensor data of the vehicle.

According to further aspects of the invention, a motion planning system is provided for a vehicle. The motion planning system includes a processor and memory having instructions stored thereon that, when executed by the processor, cause the motion planning system to analyze a plurality of obstacle data to determine a plurality of obstacle locations in a configuration space of the vehicle. A partitioning of the configuration space is performed to compute a skeletal partition representing a plurality of obstacle boundaries based on the obstacle locations. The skeletal partition is used to preferentially place a plurality of samples by a sampling-based motion planner. At least one obstacle-free path is output by the sampling-based motion planner based on the samples.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, obstacle data in a configuration space of a vehicle are analyzed to determine obstacle locations and compute a skeletal partition representing obstacle boundaries in the configuration space. The configuration space may be defined as an approximation of an area under consideration for identifying one or more feasible paths to safely guide the vehicle around obstacles. The skeletal partition is used to preferentially place a plurality of samples by a sampling-based motion planner to determine at least one obstacle-free path for the vehicle to a target destination. The skeletal partition identifies a medial axis path furthest from any identified obstacles in the configuration space. By applying a weighted distribution, randomly placed samples can be placed with a higher concentration closer to the skeletal partition to increase the probability of placing a sample in an unobstructed location and thus more rapidly finding at least one obstacle-free path for the vehicle to the target destination.

Figure 1:
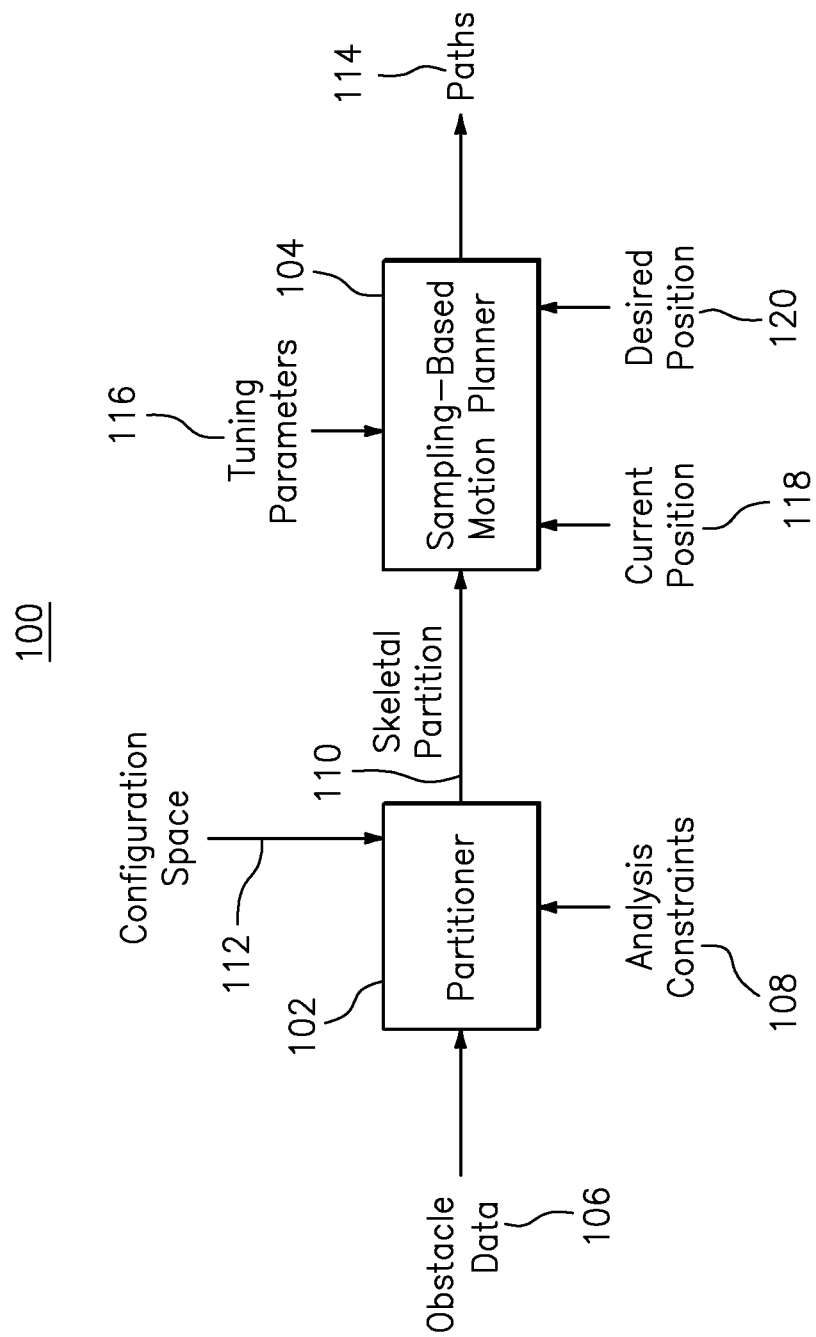
FIG. 1 schematically depicts a motion planning system in accordance with an embodiment.

FIG. 1 schematically depicts a motion planning system 100 in accordance with an embodiment. The motion planning system 100 can be implemented in a vehicle for which an obstacle-free path is to be identified. Alternatively, the motion planning system 100 can be separate from the vehicle for which an obstacle-free path is to be identified, e.g., in a remote navigation and guidance system. In the example of FIG. 1, the motion planning system 100 includes a partitioner 102 and a sampling-based motion planner 104. The partitioner 102 receives obstacle data 106 that defines obstacle locations within a configuration space 112, where the configuration space 112 may be defined as a plurality of configuration space samples. The obstacle data 106 can include a priori terrain data that are received and locally stored in one or more maps that define three-dimensional contours and locations of obstacles. The obstacle data 106 may be defined in a lower granularity format that partitions three-dimensional space into three-dimensional cells defined as free space or obstacles. Thus, obstacle boundaries may not be precisely defined and can extend with a buffer region beyond the true physical boundaries of the obstacles. The obstacle data 106 can also combine the a priori terrain data with sensor data of the vehicle to verify, update, and enhance the information in the a priori terrain data.

The partitioner 102 can also receive analysis constraints 108 that define boundaries of the configuration space 112 for analysis. For example, the analysis constraints 108 can define a three-dimensional volume for determining paths around, over, or under obstacles. The analysis constraints 108 may also specify a desired type of partitioning to be performed by the partitioner 102.

The partitioner 102 can partition the configuration space 112 to compute a skeletal partition 110 representing obstacle boundaries based on obstacle locations defined in the obstacle data 106. Obstacles at the obstacle locations in the obstacle data 106 can be compartmentalized into three-dimensional volumes that project outwardly until reaching a point that is closer to another obstacle. The compartments are defined by obstacle boundaries that represent points between obstacles that are the furthest from the obstacles. For example, the partitioner 102 can perform the partitioning of the configuration space 112 by computing a medial axis between the obstacle locations as the skeletal partition 110. A medial axis can be computed in a discrete form using Voronoi partitioning. Voronoi partitioning divides the configuration space 112 into a number of regions or partitions that include all points closer to an obstacle location than to any other obstacle location. This results in a three-dimensional Voronoi tessellation where Voronoi tessellation edges define segments equidistant from the obstacle boundaries. Thus, the partitioning of the configuration space 112 can be performed by computing Voronoi tessellation edges of the obstacle locations as the skeletal partition 110. The partitioner 102 can output the configuration space 112 as limited by the analysis constraints 108 and including obstacle information from the obstacle data 106.

The sampling-based motion planner 104 uses the skeletal partition 110 to preferentially place a plurality of samples in the configuration space 112 to determine one or more paths 114. Rather than a pure random distribution, the sampling-based motion planner 104 can develop the paths 114 applying a weighted distribution to place higher percentage of random samples closer to the skeletal partition 110. Tuning parameters 116 can be provided to define a relative weighting preference as to how close the random samples should be distributed about the skeletal partition 110 on average. The sampling-based motion planner 104 can also receive a current position 118 and a desired position 120 of the vehicle to quantify starting and ending points for the paths 114. As samples are randomly generated in proximity to the skeletal partition 110, a tree structure can be formed that includes the paths 114 where no obstacles are located. The sampling-based motion planner 104 seeks to identify at least one obstacle-free path between the current position 118 and the desired position 120 in the paths 114 based on the samples. The sampling-based motion planner 104 can apply a cost function to determine a lowest cost path of at least one obstacle-free path. Path cost can be based on total distance as well as other factors such as altitude changes, direction changes, perceived threats, obstacle types, and the like.

In one embodiment, the sampling-based motion planner 104 continues placing un-weighted random samples in the configuration space 112 to search for a lower cost path based on identifying at least one obstacle-free path. For example, an obstacle-free path that closely follows the skeletal partition 110 may be the safest path in terms of being the furthest from any obstacle locations but such a path may not be the shortest path and thus may have a higher cost. In some instances, a risk associated with selecting a path in closer proximity to an obstacle is outweighed by a substantially lower associated cost of the path. The paths 114 including at least one obstacle-free path can be output to a vehicle control system to assist in navigating the vehicle relative to obstacles.

Figure 2:
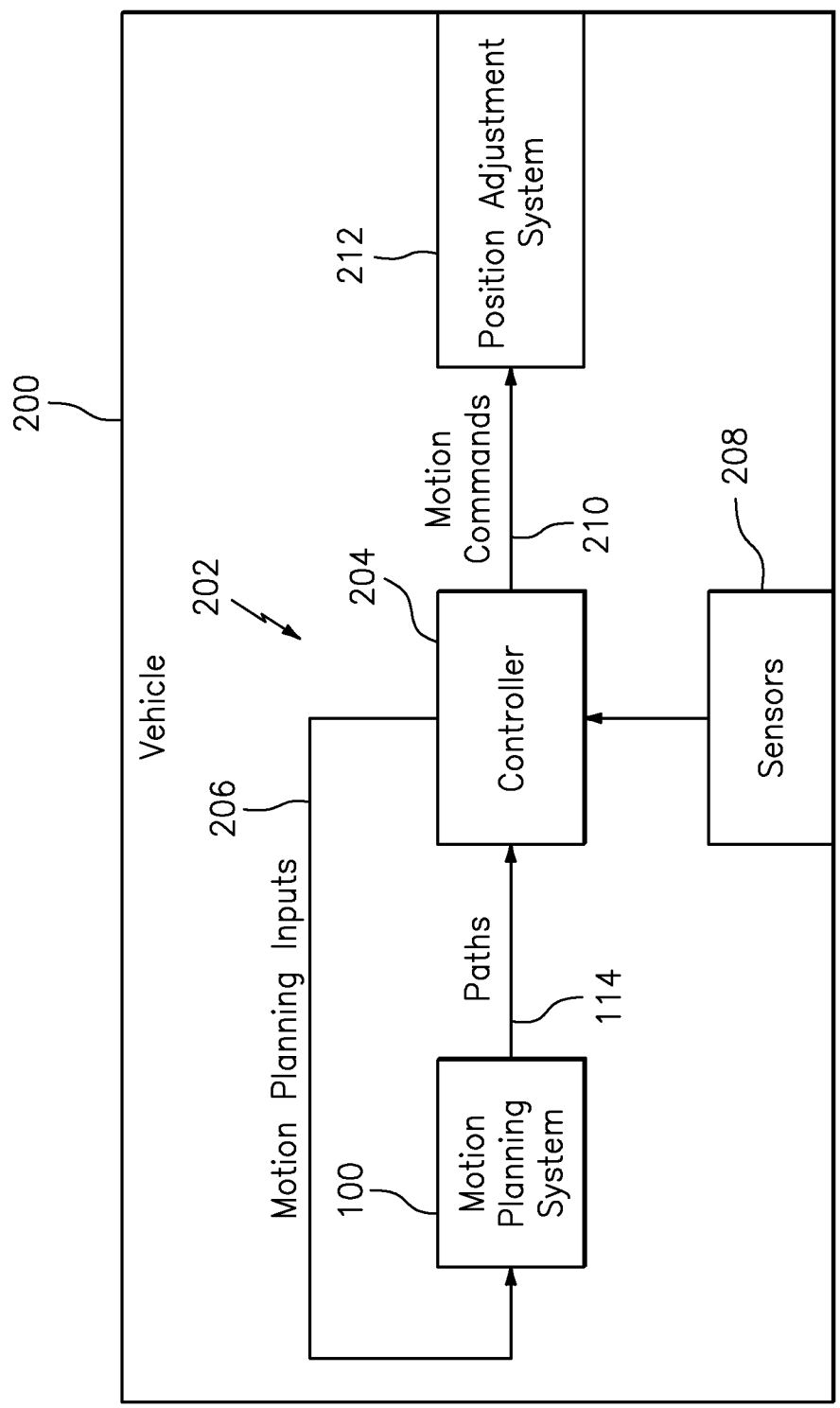
FIG. 2 schematically depicts a vehicle control system including the motion planning system of FIG. 1 in accordance with an embodiment.

FIG. 2 schematically depicts a vehicle control system 202 of a vehicle 200 including the motion planning system 100 of FIG. 1 in accordance with an embodiment. The vehicle 200 may be an optionally-piloted vehicle, an unmanned aerial vehicle, or a human piloted vehicle in which path planning assistance is desired. The vehicle 200 can be any type of movable machine, such as a fixed-wing aircraft, rotary-wing aircraft, marine vessel (e.g., submarine, ship, etc.), or land vehicle (e.g., truck, car, tank, etc.). The vehicle control system 202 includes a controller 204 that receives the paths 114 from the motion planning system 100. The controller 204 examines the paths 114 for at least one obstacle-free path to guide the vehicle 200 between the current position 118 of FIG. 1 and the desired position 120 of FIG. 1. If multiple feasible paths exist, the controller 204 may apply vehicle or mission constraints to select a lowest cost path. Alternatively, vehicle or mission constraints can be fed back to the motion planning system 100 in motion planning inputs 206 for use as the analysis constraints 108 of FIG. 1 and/or tuning parameters 116 of FIG. 1. The motion planning inputs 206 can also include data for one or more of the obstacle data 106 of FIG. 1, the current position 118 of FIG. 1, and the desired position 120 of FIG. 1.

The controller 204 can monitor sensors 208 to determine the current position 118 (FIG. 1) of the vehicle 200. The sensors 208 can also provide speed, attitude, and trajectory information for path planning. For example, the sensors 208 can include one or more inertial measurement units, a global positioning system, airspeed sensors, and other such sensor systems. To enhance the obstacle data 106 of FIG. 1, the sensors 208 may also include perception sensors, such as one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture perception sensor data indicative of obstacles. Sensor data from the sensors 208 can be preprocessed, e.g., range checked and filtered, and provided to the motion planning system 100 in the motion planning inputs 206.

The controller 204 can use data from the sensors 208 and the paths 114 to determine one or more motion commands 210 for a position adjustment system 212. The position adjustment system 212 can include any combination of propulsion and trajectory controls to maneuver the vehicle 200. For example, in the context of an aircraft, the position adjustment system 212 can include flight surface controls and engine controls to adjust aircraft attitude, altitude, and speed as position changes along an obstacle-free path.

Figure 3:
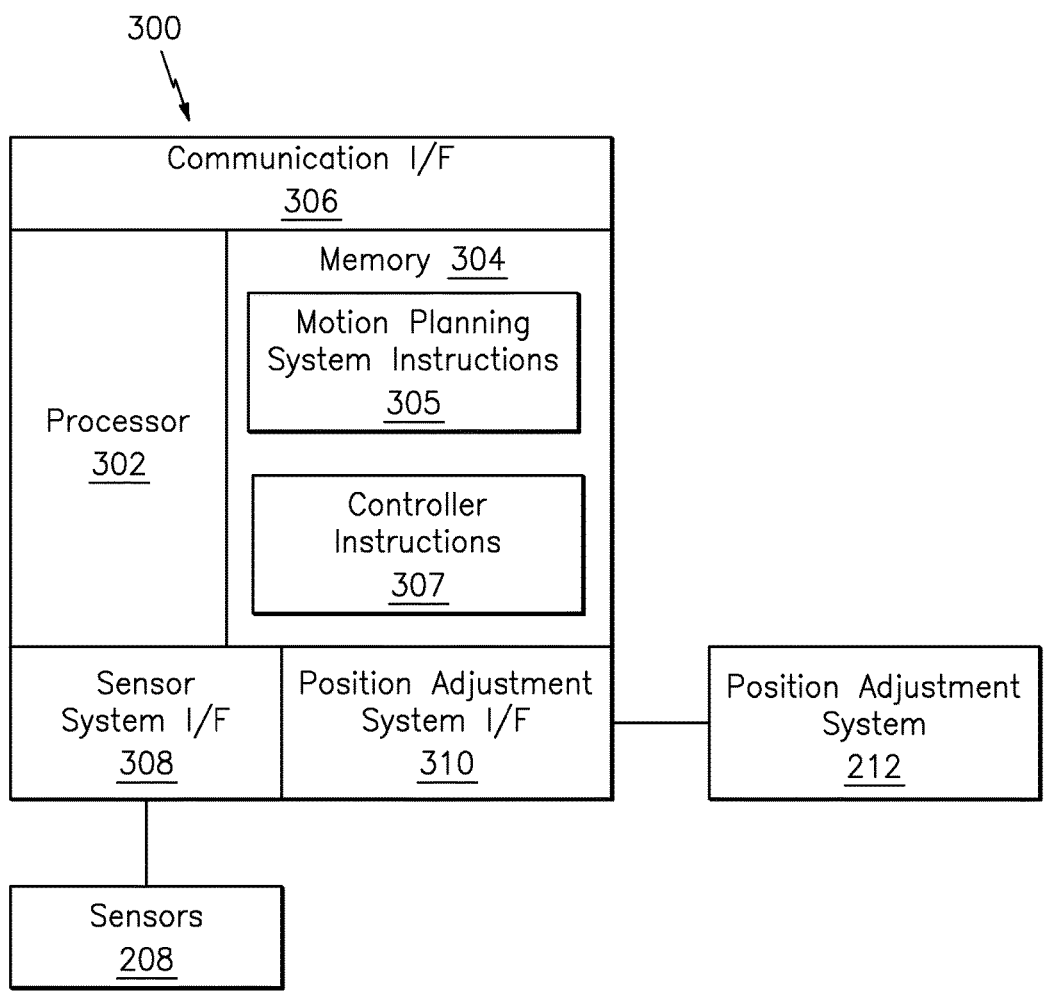
FIG. 3 schematically depicts a block diagram of a processing system for implementing the vehicle control system of FIG. 2 in accordance with embodiments.

FIG. 3 schematically depicts a block diagram of a processing system 300 for implementing the vehicle control system 202 of FIG. 2 in accordance with embodiments. The processing system 300 can be an embodiment of either or both of the motion planning system 100 of FIG. 1 and/or the controller 204 of FIG. 2. In the example of FIG. 3, the processing system 300 includes instructions and interfaces for implementing both the motion planning system 100 of FIG. 1 and the controller 204 of FIG. 2. The processing system 300 includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the processing system 300 including executable instructions stored therein, for instance, as firmware. Examples of instructions that can be stored in the memory 304 for execution by the processor 302 include motion planning system instructions 305 and controller instructions 307. The communication interface 306 can support uploading of the obstacle data 106 of FIG. 1 and mission parameters for determining the desired position 120 of FIG. 1 along with other data.

The processing system 300 can also include a sensor system interface 308 to interface with the sensors 208. The sensor system interface 308 can include analog-to-digital converters, filters, multiplexers, built-in test support, and engineering unit conversion circuitry to condition and format signals from the sensors 208 into a format that is readily usable by the controller 204 of FIG. 2 and/or the motion planning system 100 of FIG. 1. The processing system 300 can also include a position adjustment system interface 310 to send motion commands 210 of FIG. 2 to the position adjustment system 212. The position adjustment system interface 310 may format the motion commands 210 of FIG. 2 into particular servo commands and set points for vehicle control.

Figure 4:
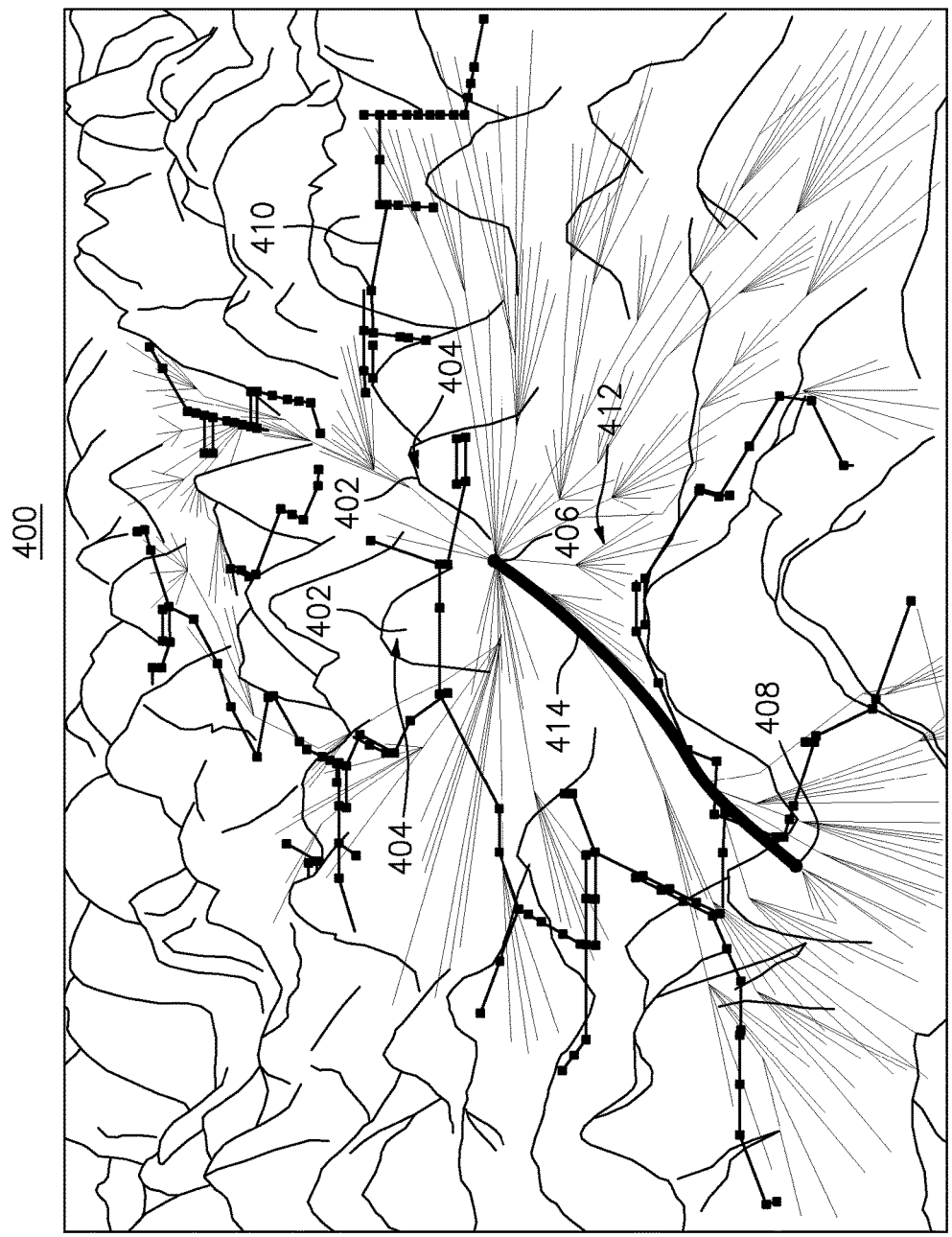
FIG. 4 depicts an example of skeletal partitioning and path determination in accordance with embodiments.

FIG. 4 depicts an example of skeletal partitioning and path determination in accordance with embodiments. In FIG. 4, a map 400 of terrain data depicts a number of obstacles 402 at obstacle locations 404, which can be captured and summarized in the obstacle data 106 of FIG. 1. A vehicle at a current position 406 may desire to find an obstacle-free path to a desired position 408. The map 400 is an example of a configuration space to be partitioned. Using the partitioner 102 of FIG. 1, a skeletal partition 410 is computed that represents obstacle boundaries based on the obstacle locations 404. The sampling-based motion planner 104 of FIG. 1 can use the skeletal partition 410 as the skeletal partition 110 of FIG. 1 and the map 400 as the configuration space 112 of FIG. 1 to preferentially place a plurality of samples 412. As the samples 412 are connected, a number of paths can be identified as feasible or infeasible between the current position 406 and the desired position 408. Infeasible paths that do not connect the current position 406 and the desired position 408 can be discarded. Once at least one obstacle-free path is identified, additional sampling may reveal other feasible obstacle-free paths having a lower cost. A lowest cost path 414 can be selected and output as a preferred path of the obstacle-free paths.

Figure 5:
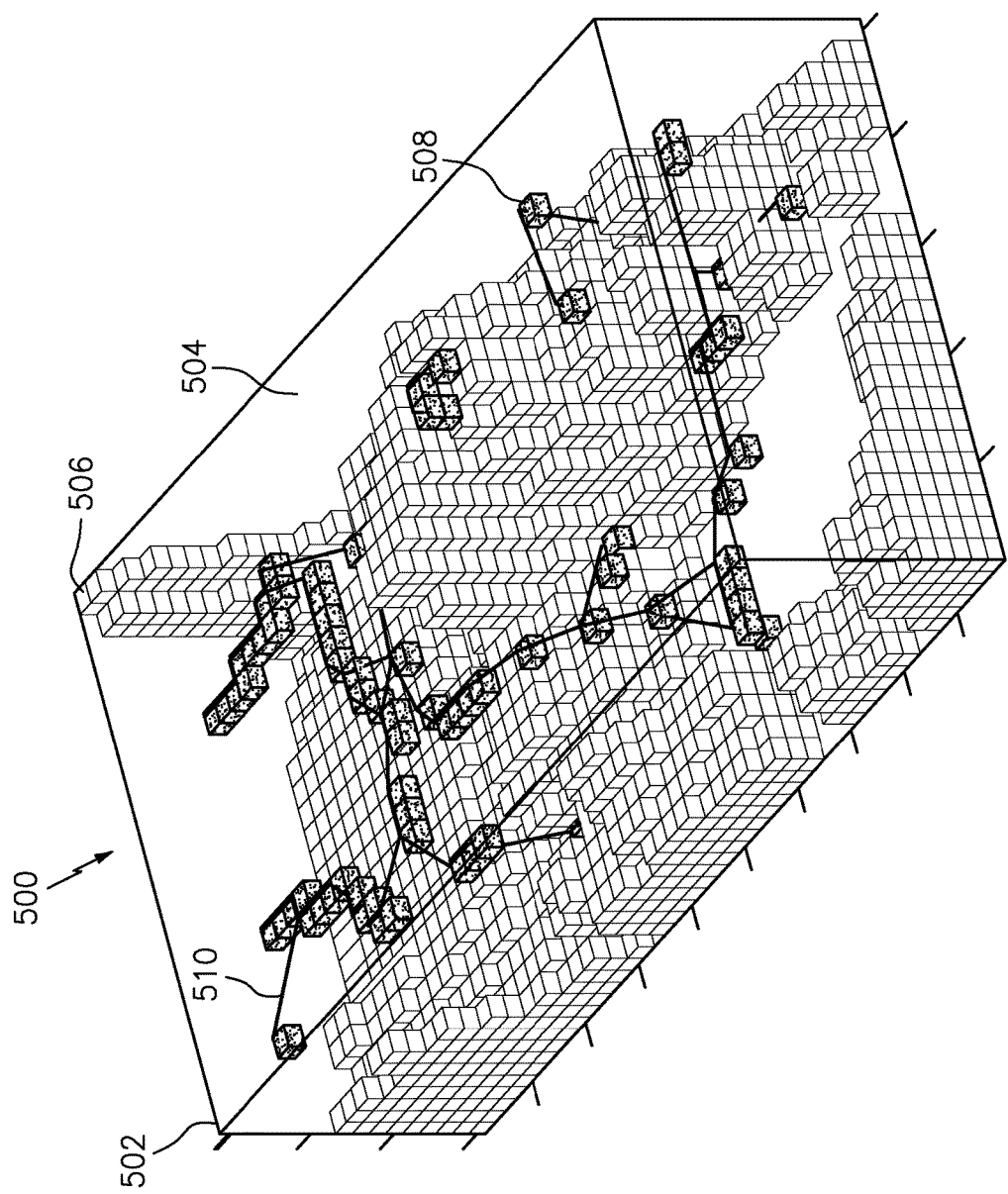
FIG. 5 depicts another example of skeletal partitioning in accordance with embodiments.

FIG. 5 depicts another example of skeletal partitioning in accordance with embodiments. In FIG. 5, a configuration space 500 is represented as an occupancy grid of obstacle data bounded in three dimensions up to a maximum altitude 502. The configuration space 500 is partitioned into three-dimensional cells defined as free space 504 or obstacles 506. A number of discrete cell locations can be defined as obstacle boundaries 508 medially between multiple obstacles 506. The obstacle boundaries 508 can be used to form a skeletal partition 510. The skeletal partition 510 is another example of the skeletal partition 110 of FIG. 1. Thus, the sampling-based motion planner 104 of FIG. 1 can use the skeletal partition 510 as the skeletal partition 110 of FIG. 1 and the configuration space 500 as the configuration space 112 of FIG. 1 to preferentially place a plurality of samples and output at least one obstacle-free path.

Technical effects include computing a skeletal partition of a configuration space of a vehicle to define a higher probability area for successfully placing samples using a sampling-based motion planner to identify at least one obstacle-free path for the vehicle. Rather than randomly placing samples across a three-dimensional space in search of an obstacle-free path, embodiments place a higher weighting on distributing samples closer to the skeletal partition that is defined between obstacle locations. This can result in reaching a feasible solution faster and more efficiently than a purely random sample placement approach.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of space partitioning for motion planning, the method comprising:
analyzing a plurality of obstacle data in a system of a vehicle to determine a plurality of obstacle locations in a configuration space of the vehicle;
performing a partitioning of the configuration space into three-dimensional cells defined as free space or obstacles in the system of the vehicle to compute a skeletal partition representing a plurality of obstacle boundaries based on the obstacle locations;

using the skeletal partition in the system of the vehicle to preferentially place a plurality of samples by a sampling-based motion planner; and outputting from the system of the vehicle at least one obstacle-free path by the sampling-based motion planner based on the samples.

2. The method of claim 1, wherein the partitioning of the configuration space is performed by computing a medial axis between the obstacle locations as the skeletal partition.

3. The method of claim 1, wherein the partitioning of the configuration space is performed by computing Voronoi tessellation edges of the obstacle locations as the skeletal partition.

4. The method of claim 1, further comprising:
applying a weighted distribution to randomly place higher percentage of samples closer to the skeletal partition.

5. The method of claim 1, further comprising:
applying a cost function to determine a lowest cost path of the at least one obstacle-free path.

6. The method of claim 5, further comprising:
placing un-weighted random samples in the configuration space to search for a lower cost path based on identifying the at least one obstacle-free path.

7. A method of space partitioning for motion planning, the method comprising:
analyzing a plurality of obstacle data in a system of a vehicle to determine a plurality of obstacle locations in a configuration space of the vehicle;
performing a partitioning of the configuration space in the system of the vehicle to compute a skeletal partition representing a plurality of obstacle boundaries based on the obstacle locations;
using the skeletal partition in the system of the vehicle to preferentially place a plurality of samples by a sampling-based motion planner; and
outputting from the system of the vehicle at least one obstacle-free path by the sampling-based motion planner based on the samples, wherein the obstacle data are acquired from a combination of a priori terrain data and sensor data of the vehicle.

8. A motion planning system for a vehicle, the motion planning system comprising:
a processor; and
memory having instructions stored thereon that, when executed by the processor, cause the motion planning system to:
analyze in a system of the vehicle a plurality of obstacle data to determine a plurality of obstacle locations in a configuration space of the vehicle;
perform a partitioning of the configuration space in the system of the vehicle to compute a skeletal partition representing a plurality of obstacle boundaries based on the obstacle locations;
use the skeletal partition in the system of the vehicle to preferentially place a plurality of samples by a sampling-based motion planner; and
output from the system of the vehicle at least one obstacle-free path by the sampling-based motion planner based on the samples, wherein the obstacle data are acquired from a combination of a priori terrain data and sensor data of the vehicle.

9. The motion planning system of claim 8, wherein the partitioning of the configuration space is performed by computing a medial axis between the obstacle locations as the skeletal partition.

10. The motion planning system of claim 8, wherein the partitioning of the configuration space is performed by computing Voronoi tessellation edges of the obstacle locations as the skeletal partition.

11. The motion planning system of claim 8, wherein the instructions further cause the motion planning system to apply a weighted distribution to place higher percentage of samples closer to the skeletal partition.

12. The motion planning system of claim 8, wherein the instructions further cause the motion planning system to:
apply a cost function to determine a lowest cost path of the at least one obstacle-free path; and
place un-weighted random samples in the configuration space to search for a lower cost path based on identifying the at least one obstacle-free path.

* * * * *